UNITED STATES PATENT OFFICE.

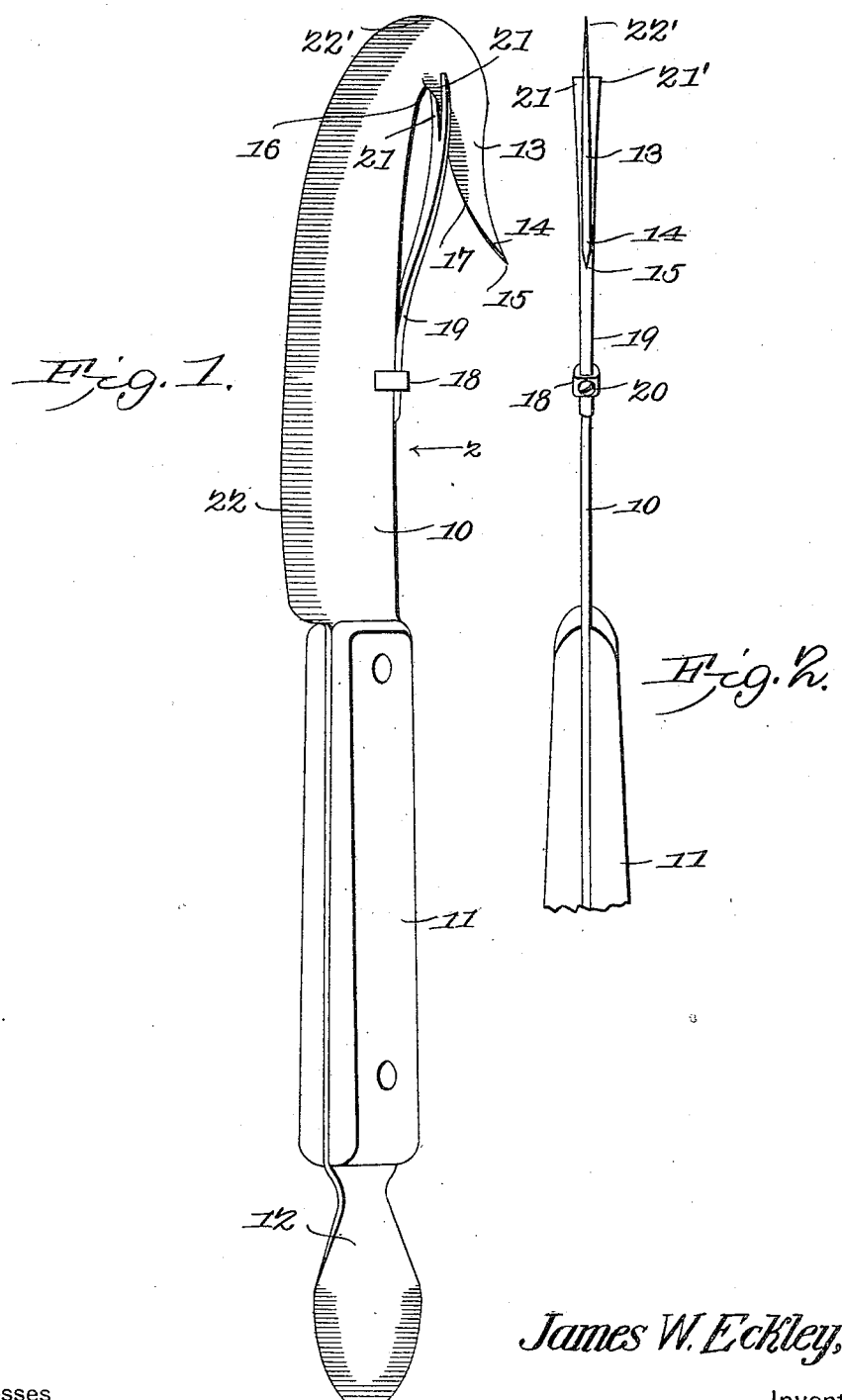

JAMES WESLEY ECKLEY, OF WALLACETON, PENNSYLVANIA, ASSIGNOR OF ONE-HALF TO GEORGE F. GOSS, OF WALLACETON, PENNSYLVANIA.

KNIFE.

No. 838,852.  Specification of Letters Patent.  Patented Dec. 18, 1906.

Application filed September 23, 1905. Serial No. 279,827.

*To all whom it may concern:*

Be it known that I, JAMES WESLEY ECKLEY, a citizen of the United States, residing at Wallaceton, in the county of Clearfield and State of Pennsylvania, have invented a new and useful Knife, of which the following is a specification.

This invention relates to knives, and has for an object to provide a knife embodying new and improved features of conveniences, utility, and efficiency.

A further object of the invention is to provide a knife which may be effectively used for cutting sheet material, such as leather, oil-cloth, and the like, but which is especially and peculiarly adapted for use in skinning animals.

Specifically, the object of the invention is to provide a knife having a cutting edge with the extremity curved backward in plane with the blade to form a hook extending backwardly toward the handle and with the cutting edge continued to and nearly about the curved end. The extremity of the hook is curved outwardly and reduced to a point, and the hook is provided with an inner cutting edge stopping short of the point. A guard is removably secured to the back of the blade and with a bifurcated end within the hook and embracing the edge.

With these and other objects in view the present invention consists in the combination and arrangement of parts, as will be hereinafter fully described, shown in the accompanying drawings, and particularly pointed out in the appended claims, it being understood that changes in the form, proportion, size, and minor details may be made without departing from the spirit or sacrificing any of the advantages of the invention.

In the drawings, Figure 1 is a side perspective view of the improved knife. Fig. 2 is an edge perspective view of the knife on line of the arrow 2 in Fig. 1.

Like characters of reference indicate corresponding parts in both figures of the drawings.

In its preferred embodiment the improved knife forming the subject-matter of this application comprises a blade 10, with a handle 11 attached thereto in any approved manner and with the blade extended at the opposite end of the handle to form the spear-point 12. The end of the blade is curved in the same plane to form the backwardly-extending hook 13, the extremity 14 of which is curved outwardly from the back of the blade and reduced to a point, as 15. The inner edge of the hook portion is reduced to cutting proportions from the curve, as at 16, but stopping short of the point, as at 17, the portion between the position indicated as 17 and the point 15 being blunt.

To the back of the blade is secured a clip 18, within which is disposed a guard member 19 in any removable manner, as by the screw 20, and which is bifurcated at the end opposite to form the fingers 21 21', embracing the cutting edge of the hook near the curve 16.

The outer edge of the blade is reduced to a cutting edge, as at 22, the cutting proportions being continued to and partly about the curved end as to the position 22'.

As used for skinning the cutting-hook will be used for slitting by driving the point 15 through the hide and drawing the knife in the direction of the handle, the blunt inner edge near the point keeping the point beneath the hide while the guard holds the hide in contact with the cutting edge.

For cutting the tissues connecting the hide and flesh the curved cutting edge will be used, while the spear-point may be used for any desired purpose, as forming openings for the gambrels and the like.

The guard 19 is made removable, so that it may be removed to permit the grinding and sharpening of the inner edge of the hook.

Having thus described the invention, what is claimed is—

1. A knife embodying a blade, a cutting-hook outstanding from the back and in plane with the blade, a guard within the hook and means to removably secure the guard to the back of the blade.

2. A knife embodying a cutting-blade, a backwardly-curved hook outstanding from the back and with the extremity curved outwardly and reduced to a point and provided with an inner cutting edge stopping short of
5 the point, a guard within the hook and means to removably secure the guard to the back of the blade.

In testimony that I claim the foregoing as my own I have hereto affixed my signature in the presence of two witnesses.

JAMES WESLEY ECKLEY.

Witnesses:
 R. E. SHAW,
 GEO. K. McGILL.